United States Patent
Robert et al.

(10) Patent No.: US 8,305,431 B2
(45) Date of Patent: Nov. 6, 2012

(54) DEVICE INTENDED TO SUPPORT THE DRIVING OF A MOTOR VEHICLE COMPRISING A SYSTEM CAPABLE OF CAPTURING STEREOSCOPIC IMAGES

(75) Inventors: Caroline Robert, Paris (FR); Julien Rebut, Paris (FR)

(73) Assignee: Valeo Vision, Bobigny (FR)

( * ) Notice: Subject to any disclaimer, the term of this patent is extended or adjusted under 35 U.S.C. 154(b) by 894 days.

(21) Appl. No.: 12/211,906

(22) Filed: Sep. 17, 2008

(65) Prior Publication Data

US 2009/0073258 A1    Mar. 19, 2009

(30) Foreign Application Priority Data

Sep. 17, 2007    (FR) .................................... 07 06533

(51) Int. Cl.
*H04N 13/02*    (2006.01)
(52) U.S. Cl. ............................ 348/47; 348/42
(58) Field of Classification Search .................. 348/42, 348/47
See application file for complete search history.

(56) References Cited

U.S. PATENT DOCUMENTS

| | | | |
|---|---|---|---|
| 5,001,558 A | 3/1991 | Burley et al. | |
| 5,307,136 A | 4/1994 | Saneyoshi | |
| 5,307,419 A | 4/1994 | Tsujino et al. | |
| 6,115,651 A * | 9/2000 | Cruz | 701/1 |
| 7,196,305 B2 | 3/2007 | Shaffer et al. | |
| 7,266,221 B2 | 9/2007 | Shima et al. | |
| 2003/0081815 A1 | 5/2003 | Shima et al. | |
| 2005/0278088 A1* | 12/2005 | Thorner | 701/28 |
| 2006/0157639 A1 | 7/2006 | Shaffer et al. | |
| 2006/0268115 A1 | 11/2006 | Eggers et al. | |
| 2007/0046449 A1 | 3/2007 | Koike et al. | |
| 2007/0070210 A1* | 3/2007 | Piccionelli et al. | 348/211.11 |
| 2007/0165910 A1 | 7/2007 | Nagaoka et al. | |
| 2007/0291992 A1 | 12/2007 | Shima et al. | |
| 2008/0055411 A1* | 3/2008 | Lee | 348/148 |
| 2008/0122597 A1* | 5/2008 | Englander | 340/433 |

FOREIGN PATENT DOCUMENTS

| | | |
|---|---|---|
| DE | 10343406 A1 | 4/2005 |
| EP | 0488828 B1 | 6/1992 |
| GB | 2261339 A | 5/1993 |

* cited by examiner

*Primary Examiner* — Phuoc Nguyen
(74) *Attorney, Agent, or Firm* — Jacox, Meckstroth & Jenkins

(57) ABSTRACT

A system and method to support the driving of a motor vehicle comprising in particular a system capable of capturing images, wherein the system for capturing images comprises a stereoscopic image capturing system having at least a first camera and a second camera, with the first camera presenting a field of vision) greater than the field of vision of the second camera, and with the stereoscopic system thereby conferring a degree of multifunctionality to the device supporting the driving of the vehicle.

18 Claims, 1 Drawing Sheet

Figure 1:
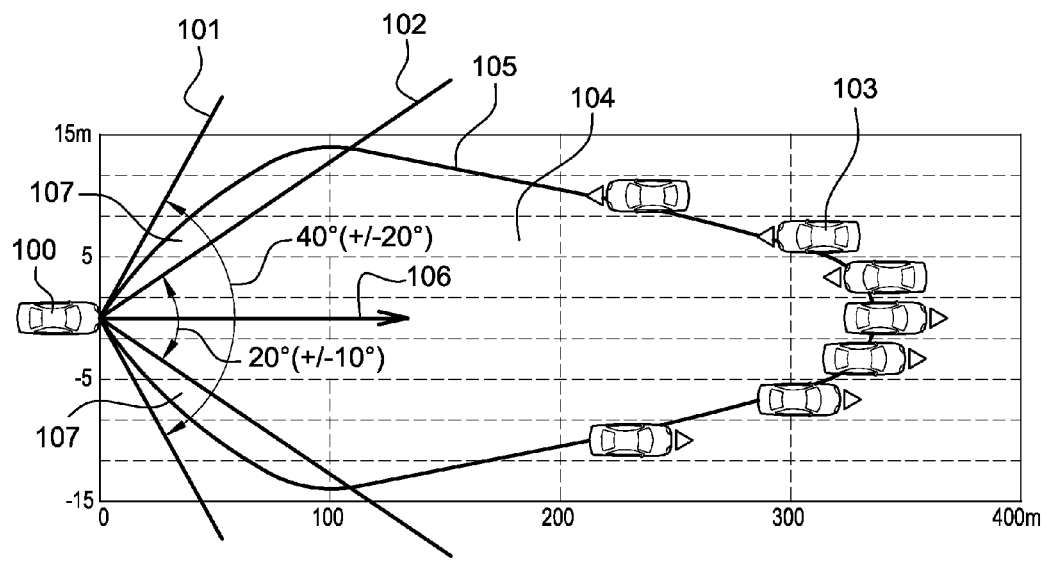

DEVICE INTENDED TO SUPPORT THE DRIVING OF A MOTOR VEHICLE COMPRISING A SYSTEM CAPABLE OF CAPTURING STEREOSCOPIC IMAGES

CROSS-REFERENCE TO RELATED APPLICATIONS

This application claims priority to French Application No. 0706533 filed Sep. 17, 2007, which application is incorporated herein by reference and made a part hereof.

BACKGROUND OF THE INVENTION

1. Field of the Invention

Generally speaking, the sphere of application of the present invention is that of advanced driving support systems, and more particularly, of that of the detection and identification of obstacles, in particular other vehicles either crossing the vehicle's path or travelling in front of it.

2. Description of the Related Art

The detection and identification of obstacles is one of the most researched and key spheres in the field of research into advanced driving support systems introduced during the last fifteen years, in particular by manufacturers of motor vehicles and motor vehicle equipment. Numerous solutions have been envisaged and put into practice for the detection and identification of obstacles from within a motor vehicle, all of which are essentially based on radar, lidar and ultrasound technologies for close and low speed obstacles and also on processes involving the use of devices comprising cameras.

Radar and lidar sensors are typically used for long distance detection such as the ACC system (Autonomous Cruise Control), which, for example, can directly provide information on the position and in some cases on the 3D speed of surrounding objects. This information allows the different objects to be assessed and to relate useful information to them such as their positions and even their speeds, together with their current coordinates in three dimensions, in relation to the vehicle fitted with the sensor device and also in relation to a fixed reference point if the position of the vehicle is properly established with regard to this reference point.

But sensors of this type do not offer a wide range of vision and their angular positioning is never very precise. Moreover, they do not provide any information on the highway environment, such as the position of the vehicle within its traffic lane, the number of traffic lanes, the trajectory of the route, the classification of the obstacles, the possibility of recognizing infrastructural elements such as roadside panels, etc. Moreover, long range, narrow fields are unable to detect at a sufficiently early stage so-called <<cut-in>> scenarios, where a vehicle arriving from a different traffic lane to that of the vehicle fitted with the sensor threatens to <<cut in>> and the driver has to be responsible for controlling the situation.

Methods for detecting obstacles by using on-board cameras can resolve such problems, which are otherwise beyond the capabilities of radar or lidar systems. The information provided by a camera comes in the form of a bi-dimensional image (2D), produced in general by the projection of a typical perspective of the real three-dimensional (3D) world onto the image plane.

The methods that can be used for the detection of obstacles by the use of a camera can be divided into three main categories: the recognition of a two-dimensional shape, the recovery of three-dimensional information by interpreting the movement in monovision—in other words, from the movement captured by a single camera—and triangulation in stereovision. This last category is the most satisfactory in terms of the quality of the results obtained, as it provides relatively precise information on the distance from an obstacle.

Furthermore, the different types of sensors in the form of cameras used up to now in motor vehicles to carry out driving support functions can be broken down into two main groups, both with advantages and disadvantages:
- grey levels cameras also known as black and white cameras;
- color cameras.

A color camera, can, in particular, aid the identification and recognition of rear lights. In this way, the extent of the detection is increased as a result of the information provided in color. Conventionally, this type of camera is a grey levels camera, but a filter, known as a Bayer filter, is arranged in front of it, which enables the red, green and blue (RGB) components of each captured image to be calculated. However, these filters have the effect of reducing the spatial resolution of the sensor device used with the result that the calculation of the distance—often effected by measuring the distance between two projectors and a detected vehicle—obtained by the use of a single color sensor is less precise than a calculation carried out by a single grey levels sensor. In certain applications for driving support, in particular the BeamAtic™ function, this information is of crucial importance because the operation of switching the headlamp beam depends directly on the distance at which oncoming or followed vehicles are detected. However, above a certain distance, a grey levels sensor cannot enable the tail lamps of one vehicle to be distinguished from those of another and as it does not receive any color information it cannot enable tail lamps to be detected at all. For the grey levels sensors currently in use, this maximum distance is 450 meters. The choice between a color sensor and a grey level sensor is therefore a compromise between the scope of the detection and the accuracy of the assessment distance.

The use of stereoscopic vision systems, regardless of whether the two cameras used are color cameras or grey levels cameras, enables the distance from detected objects to be accurately calculated so that the BeamAtic™ function is carried out in a satisfactory manner. Generally speaking, certain functions will require a higher level of resolution than others or alternatively a less wide field of vision. But the presence of two cameras for a dedicated function represents a major cost item, with the result that this solution is often prohibitive.

There is, therefore, a need to provide a system and method that overcomes one or more problems of the past.

SUMMARY OF THE INVENTION

The subject of the present invention proposes a solution to the problems raised above. The invention still proposes the use of a stereoscopic system for the capture of images contained within a device intended to support driving, but it proposes that the system be carried out in such a way that it offers and make possible a genuine multifunctionality in terms of driving support applications. The introduction of the aspect of multifunctionality is accompanied by a number of advantages, for example the integration of the different items of equipment required for the driving support systems is simplified, the amount of space required at a windscreen level is reduced and both the cost and the complexity of the linkages are reduced. To this end, the present invention proposes that the device intended to support driving a motor vehicle employs a stereoscopic system comprising two cameras having different fields of vision, thereby incorporating the advantages of both image capturing systems. Preferably, this would comprise both a grey levels camera and a color camera, thus allowing more functions to be employed.

The object of the present invention is a device intended to support the driving of a motor vehicle comprising a system for the capture of images in the form of a stereoscopic system. The device supporting the driving, and more particularly, the stereoscopic image capturing system, is arranged inside a motor vehicle. The device according to the present invention is intended essentially to improve the supporting functions of driving developed within motor vehicles, while at the same time economically providing a number of these functions. By way of example, these functions can be said to include an automatic beam switching system, known as the BeamAtic™ function, which allows dipped headlamps to be switched to full beam headlamps and vice versa in accordance with prevailing traffic conditions.

The present invention thus relates to a device intended to support driving a motor vehicle comprising in particular a system for capturing images and in which this system for capturing images is a stereoscopic system for capturing images having at least a first and a second camera, with the first camera having a greater field of vision than that of the second camera, so that the stereoscopic system confers a degree of multifunctionality on the device for driving support.

In this way, the second camera is able to capture an image on a zone equivalent to a part of the image captured by the first camera, enabling a zoom effect to be created in the second image.

In addition to the principal features mentioned in the previous paragraph, the device according to the present invention can also comprise one or more of the following additional features:
- the first camera and the second camera have an overlapping zone in their fields of vision, which is generally centered on the direction in which the vehicle is travelling;
- the first camera is of the grey levels camera type and the second camera is of the color camera type; in this way, the second camera supplies information on the colors of the objects that are detected;
- the field of vision of the first camera is between 30 and 50 degrees, in particular 40 degrees, while the field of vision of the second camera is between 15 and 25 degrees, in particular 20 degrees;
- the size of the field of vision of the first camera is a multiple of the size of the field of vision of the second camera;
- the field of vision of the first camera and the field of vision of the second camera are generally centered on the direction of travel the motor vehicle;
- the second camera is fitted with a sensor of the RGBi type or a sensor enabling an image to be captured in grey levels in association with the calculation of the red components of the captured image, such as a sensor of the type RedClear.

In the same way as the RGB type sensors, sensors of the RGBi types and sensors of the RedClear type function by using a grey levels sensor in front of which is arranged a filter. In the case of the RGBi sensors, this filter enables the red, green, blue and infra-red components of the captured image to be calculated, while in the case of the RedClear sensor, the capture of the grey levels images is associated with the calculation of the red components of the captured image. The advantage of the RedClear sensors is that they provide important color information (e.g. red tail lights) and furthermore their resolution is better than that of an RGB or an RGBi sensor.

Insofar as they are not mutually exclusive, the different additional features of the device according to the present invention can be combined on the basis of all possible permutations to achieve different embodiments of the invention.

The present invention also relates to the process for capturing a stereoscopic image using a device according to the present invention, comprising the following steps:
- the capture of at least a first image using the first camera,
- the capture of a second image using the second camera, and
- the matching of the first image and the second image.

Preferably during this last step, the matching of the first and the second image comprises the following sub-steps:
- the extraction of the portion from the first image that corresponds to the second image in its full resolution, and
- the extraction of a third image from the second image, with this third image corresponding to the undersampled second image in such a way that the third image and the portion of the first image present, in pixels, the same dimensions, with the pair of images obtained in this manner permitting the superimposition arrangement to be achieved.

The present invention also relates to a motor vehicle fitted with a device to support driving according to the present invention, having the principle features and possibly one or more of the additional features indicated above.

A better understanding of the present invention and its different applications will be obtained by studying the following description together with the accompanying figures.

These and other objects and advantages of the invention will be apparent from the following description, the accompanying drawings and the appended claims.

BRIEF DESCRIPTION OF THE ACCOMPANYING DRAWINGS

Figure 2:
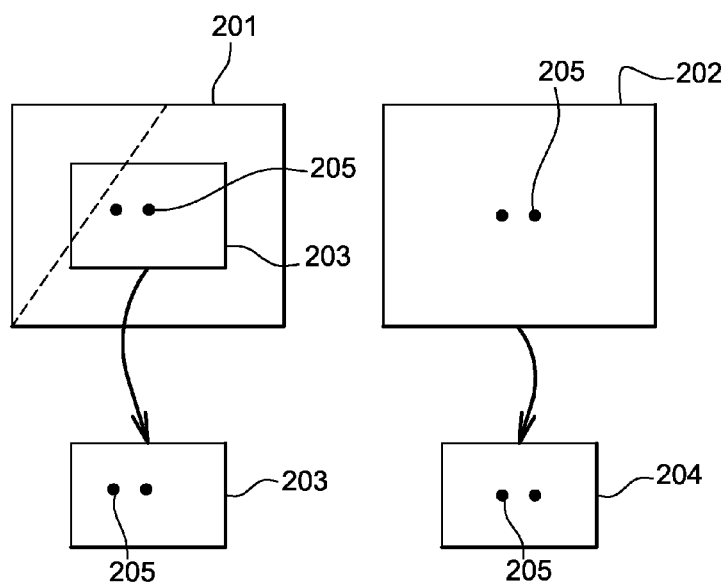

The figures are included as a guide only and are not intended to limit the scope of the invention. The figures show as follows:

FIG. 1 is a schematic representation of a typical application of the device according to the present invention; and FIG. 2 is a schematic representation of an operating application based on the images captured by the device according to the present invention.

DETAILED DESCRIPTION OF THE PREFERRED EMBODIMENTS

FIG. 1 shows a vehicle 100 fitted with a device according to the present invention. This latter comprises at least a first camera of the grey levels camera type, which does not therefore provide color information, and a second camera of the color camera type. In the example shown, the first camera has a first field of vision 101, defined by a viewing angle centered on the direction of travel 106 of the vehicle 100, the size of this angle being in the order of 40 degrees. The second camera has a second field of vision 102, also centered on the direction of travel 106 of the vehicle 100, with a lesser field of vision than the first camera, for example in the order of 20 degrees. Advantageously, the second field of vision 102 contains a complete glare zone 105, representing a zone, in which any other vehicle 103 that is present risks being dazzled if the vehicle 100 uses its main beam headlamps. In this way, the two zones present an overlapping or covering zone 104, for which the images can be acquired by the first and by the second camera, providing, in particular, stereoscopic vision within this zone. Any oncoming or followed vehicles located within one of these fields of vision will thus be detected and the detection information that is obtained can be subjected to at least one treatment stage that is specific to a driving support function.

A device of this nature will enable in particular the following driving support functions to be carried out:

- mono camera functions such as LDWS, BeamAtic™, FPW etc., which require a sufficiently large viewing angle to cover three traffic lanes and capable of providing images on bends. Typically, the viewing angle used for these functions is 40 degrees. For such functions, the use of the grey levels camera is preferred. Wide angles, for example those of 40 degrees, but also others within the range of 30 and 50 degrees, are also used and enable the user to benefit from a wide field of vision providing information on both the traffic lane followed by the vehicle and also the two adjoining lanes. A field of 40 degrees is also necessary when overtaking, for entering bends and also for detecting streetlamps;
- mono camera functions, such as Night Vision or the detection of pedestrians, require a better level of resolution in respect of distant objects, which thus implies a narrower viewing angle—generally 20 degrees. For these functions, the use of the color image camera is preferred. Furthermore, using the color image camera improves the detection scale for tail lights;
- any function that requires a relatively precise estimation of detected objects; with its stereoscopic system, the device according to the invention enables these functions to be carried out. One such function, for example, is that of the progressive adjustment of the length of the typical coded headlamp beam in relation to the presence of other motor vehicles.

FIG. 2 shows more particularly the use of the device according to the present invention to give a precise estimation of the distance from an obstacle.

The grey levels camera enables any type of object to be detected within a range of distances from 0 meter to the maximum detection distance given for the camera, with a limit for the detection of tail lamps at long distances. At long distances, the main undipped beam of the headlamps of the vehicle 100 will only dazzle when the potential obstacle is approximately in line with the vehicle 100. In this case, the obstacle appears in a first image 201 generated by the first camera and also in a second image 202 generated by the second camera because it is inevitably present in the covering zone 104.

In this way, the detection of an object, for example, the two headlamps 205 of a vehicle in the example shown, in the first image 201 is confirmed in the second image 202, and benefits from a zoom effect in the second image 202, in a zone equivalent to a portion 203 of the first image 201, additionally providing information on the color of the objects detected.

At these extended distances, the traditional means of estimating distances (vertical position, triangulation on the basis of the vehicle width etc.) provide results that are far from precise. In the device according to the invention, the principle of stereovision is used to estimate the distance from the obstacle. The principle of stereovision can be applied to any object detected within the covering zone 104. Any object that is detected in this overlapping zone 104 is present on the first image 201 and also on the second image 202, which are then matched. This matching effect is achieved according to the present invention by extracting the portion 203 from the first image 201; this portion 203 corresponds to the second image 202 in full resolution. To obtain equivalence, an image 204 is extracted from the second image 202 which corresponds to the undersampled second image 202, in such a way that the image 204 and the portion 203 present, in the form of pixels, the same dimensions. The pair of images thus obtained enable the matching effect to be achieved. Although effected with two 40°/20° cameras, the precision of the stereoscopic vision system of the device according to the present invention is the same as that achieved with a stereovision system employing two 40°/40° cameras.

A special zone, known as the proximity zone 107, and visible in FIG. 1, is used to detect obstacles when overtaking or when encountering oncoming vehicles in a bend. At these short distances, the conventional principles of estimating distances by a mono camera can provide sufficient precision.

Advantageously, in the present invention, the camera producing grey levels camera and the color camera use identical sensors, especially in terms of resolution. However, in certain embodiments, different types of sensors may be used.

For certain embodiments of the device according to the present invention, the use of a color camera of the type RGBi is proposed, in which a large number of pixels in the sensor are sensitive to x-rays. Certain functions, in particular those connected with night vision are thus even more effective.

The example described above is not intended to be limitative. For example, on the basis of the same principles, it would be possible to use two grey levels cameras with different fields of vision to carry out two different functions requiring different resolutions and fields of vision (in this case, evidently, the functions would not be based on color detection).

While the method herein described, and the form of apparatus for carrying this method into effect, constitute preferred embodiments of this invention, it is to be understood that the invention is not limited to this precise method and form of apparatus, and that changes may be made in either without departing from the scope of the invention, which is defined in the appended claims.

What is claimed is:

1. A device intended to support the driving of a motor vehicle for use in a system for the capture of images, wherein said system for the capture of images comprises a stereoscopic system for the capture of images, said stereoscopic system comprising a first camera and a second camera, said first camera having a first field of vision larger than a second field of vision of said second camera, so that said stereoscopic system confers a degree of multifunctionality on said device for driving support;
   said first camera first field of vision is defined by a viewing angle generally centered on a direction of travel and said second camera second field of vision being generally centered on said direction of travel and said first and second fields of vision defining an overlapping zone;
   wherein said second field of vision falls entirely within said first field of vision, said first and second field of visions being generally centered on a direction in which the vehicle is traveling so that both said first and second cameras capture said images of a common object in front of the vehicle so that images captured by said first and second cameras within said overlapping zone provide stereoscopic vision within said overlapping zone.

2. The device according to claim 1, wherein said overlapping zone is generally centered on said direction in which the vehicle is travelling.

3. The device according to claim 2, wherein said first camera is of the grey levels camera type and said second camera is of the color camera type.

4. The device according to claim 2, wherein said first field of vision of said first camera is between 30 and 50 degrees while said second field of vision of said second camera is between 15 and 25 degrees.

5. The device according to claim 2, wherein the size of said first field of vision of said first camera is a multiple of said second field of vision of said second camera.

6. The device according to claim 2, wherein said first field of vision of said first camera and said second field of vision of said second camera are generally centered on said direction of travel in front of the motor vehicle.

7. The device according to claim 1, wherein said first camera is of the grey levels camera type and said second camera is of the color camera type.

8. The device according to claim 7, wherein said first field of vision of said first camera is between 30 and 50 degrees while said second field of vision of said second camera is between 15 and 25 degrees.

9. The device according to claim 7, wherein the size of said first field of vision of said first camera is a multiple of said second field of vision of said second camera.

10. The device according to claim 7, wherein said first field of vision of said first camera and said second field of vision of said second camera are generally centered on said direction of travel in front of the motor vehicle.

11. The device according to claim 7, wherein said second camera is fitted with a sensor of the RGBi type or a sensor enabling an image to be captured in grey levels in association with the calculation of the red components of said captured image.

12. The device according to claim 1, wherein said first field of vision of said first camera is between 30 and 50 degrees, while said second field of vision of said second camera is between 15 and 25 degrees.

13. The device according to claim 12, wherein the size of said first field of vision of said first camera is a multiple of said second field of vision of said second camera.

14. The device according to claim 1, wherein the size of said first field of vision of said first camera is a multiple of said second field of vision of said second camera.

15. The device according to claim 1, wherein said second camera is fitted with a sensor of the RGBi type or a sensor enabling an image to be captured in grey levels in association with the calculation of the red components of said captured image.

16. A process for capturing a stereoscopic image using a device according to claim 1, comprising the following steps:
 capturing at least said first image using said first camera,
 capturing said second image using said second camera, and
 matching of said first image and said second image.

17. The process according to claim 16, wherein said step of matching of said first and second images comprises the following sub-steps:
 extracting of a portion from said first image that corresponds to said second image in its full resolution, and
 extracting of a third image from said second image, said third image corresponding to said second image in such a way that said third image and said portion from said first image present, in pixels, the same dimensions, with the pair of images obtained in this manner permitting the matching arrangement to be achieved.

18. A motor vehicle equipped with a device intended to support driving according to claim 1.

* * * * *